(12) United States Patent
Stearne et al.

(10) Patent No.: US 12,409,484 B2
(45) Date of Patent: Sep. 9, 2025

(54) PIPE BENDER ALIGNMENT ASSEMBLY

(71) Applicants: Dwight Stearne, Roseville, CA (US);
Damien Akens, Roseville (CA)

(72) Inventors: Dwight Stearne, Roseville, CA (US);
Damien Akens, Roseville (CA)

( * ) Notice: Subject to any disclaimer, the term of this patent is extended or adjusted under 35 U.S.C. 154(b) by 390 days.

(21) Appl. No.: 18/111,974

(22) Filed: Feb. 21, 2023

(65) Prior Publication Data
US 2024/0278307 A1 Aug. 22, 2024

(51) Int. Cl.
G01B 3/56 (2006.01)
B21D 7/02 (2006.01)
B21D 7/16 (2006.01)
G01B 5/24 (2006.01)

(52) U.S. Cl.
CPC ............... B21D 7/16 (2013.01); B21D 7/02 (2013.01); G01B 3/56 (2013.01); G01B 5/24 (2013.01)

(58) Field of Classification Search
CPC . B21D 7/16; B21D 7/02; B21D 7/063; G01B 3/56; G01B 5/24
See application file for complete search history.

(56) References Cited

U.S. PATENT DOCUMENTS

| 6,124,935 | A | * | 9/2000 | Matthews | G01C 15/008 356/138 |
| 6,708,782 | B1 | * | 3/2004 | Turney | E21B 7/067 175/45 |
| 6,877,236 | B1 | * | 4/2005 | Williams | G01C 15/002 33/286 |
| 7,155,834 | B2 | * | 1/2007 | Palumbo, III | G01C 15/002 33/645 |
| 7,748,127 | B1 | * | 7/2010 | Cosimano | G01C 15/002 33/286 |
| 7,886,565 | B2 | | 2/2011 | Hainzinger | |
| 8,893,395 | B2 | * | 11/2014 | Mickow | G01C 15/002 33/529 |
| 9,080,864 | B1 | * | 7/2015 | McCarthy | G01C 15/004 |
| 9,551,145 | B2 | * | 1/2017 | Aguilar | E04B 2/00 |
| 10,309,776 | B2 | * | 6/2019 | Doeren | G01C 9/34 |
| D939,363 | S | | 12/2021 | Stellato | |
| 2007/0214666 | A1 | * | 9/2007 | Kishi | G01C 15/004 33/281 |
| 2015/0033813 | A1 | | 2/2015 | Leclerc | |
| 2017/0343348 | A1 | * | 11/2017 | Doeren | G01C 9/34 |
| 2020/0173778 | A1 | | 6/2020 | Smith | |
| 2020/0282505 | A1 | | 9/2020 | Benton | |
| 2021/0190494 | A1 | * | 6/2021 | Lindberg | G01C 15/105 |
| 2021/0213507 | A1 | | 7/2021 | Heaird | |
| 2024/0278307 | A1 | * | 8/2024 | Stearne | B21D 7/02 |
| 2024/0310166 | A1 | * | 9/2024 | Goffredo | G01B 11/27 |

FOREIGN PATENT DOCUMENTS

WO    WO2013131179    9/2013

* cited by examiner

Primary Examiner — Yaritza Guadalupe-McCall

(57) ABSTRACT

A pipe bender alignment assembly includes a sleeve that is positionable around a pipe. A plurality of laser mounts is each attached to and extends outwardly from the sleeve and a plurality of laser emitters is mounted to a respective one of the plurality of laser mounts to emit a beam of laser light outwardly from the sleeve. The sleeve is rotatable on the pipe to align a respective one of the plurality of laser emitters with an alignment mark on a pipe bender to visually indicate that the pipe is precisely located in the pipe bender for accurately bending the pipe. A magnet is integrated into the sleeve for retaining the sleeve at a particular angle of rotating on the pipe.

7 Claims, 3 Drawing Sheets

PIPE BENDER ALIGNMENT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pipe bender devices and more particularly pertains to a new pipe bender device for precisely positioning a pipe in a pipe bender. The device includes a sleeve that is slidable on a pipe and a plurality of laser emitters integrated into the sleeve. The device includes a magnet integrated into the sleeve for retaining the sleeve at a selected spot on the pipe. The pipe is rotated to align a beam of laser light emitted from a respective laser emitter with an alignment mark on the pipe bender.

(2) Description of Related Art Including Information Disclosed Under 37 CFR 1.97 and 1.98

The prior art relates to pipe bender devices including a pipe bender with a curved angled indicator. The prior art discloses a pipe bender that includes a curved saddle and a handle. The prior art discloses a pipe fitting device that comprises a plurality of pipe fittings that is each insertable into a leg of a pipe and a plurality of light emitters each integrated into a respective pipe fitting for emitting a beam of light to indicate where a junction with the leg of the pipe will intersect an adjacent pipe. The prior art discloses a laser guided conduit bender that includes a pipe bender and a laser pointer attached to the pipe bender.

BRIEF SUMMARY OF THE INVENTION

An embodiment of the disclosure meets the needs presented above by generally comprising a sleeve that is positionable around a pipe. A plurality of laser mounts is each attached to and extends outwardly from the sleeve and a plurality of laser emitters is mounted to a respective one of the plurality of laser mounts to emit a beam of laser light outwardly from the sleeve. The sleeve is rotatable on the pipe thereby facilitating a respective one of the plurality of laser emitters to be aligned with an alignment mark on a pipe bender to visually indicate that the pipe is precisely located in the pipe bender for accurately bending the pipe. A magnet is integrated into the sleeve for retaining the sleeve at a particular angle of rotating on the pipe.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
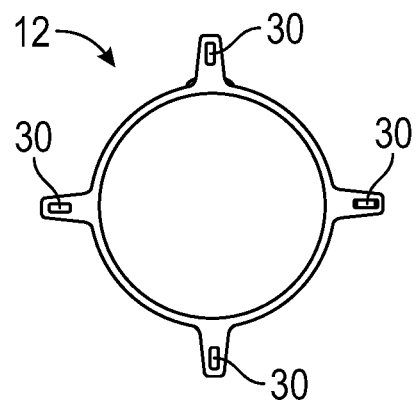
FIG. 1 is a front view of a pipe bender alignment assembly according to an embodiment of the disclosure.
Figure 2:
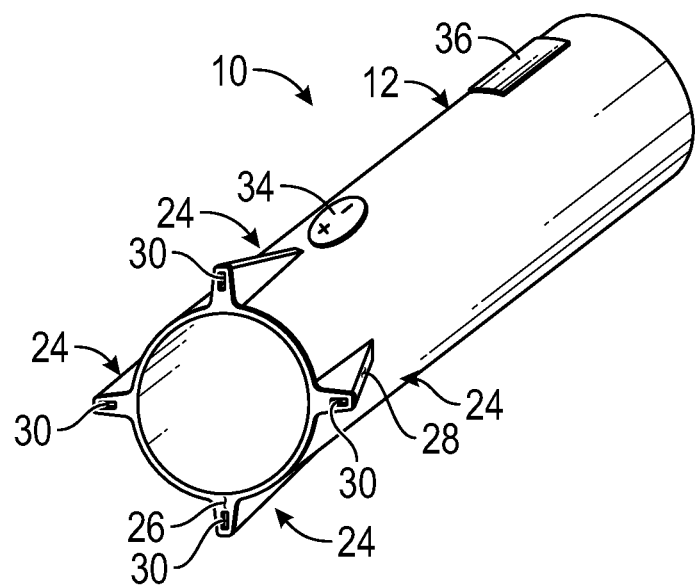
FIG. 2 is a top perspective view of an embodiment of the disclosure.
Figure 3:
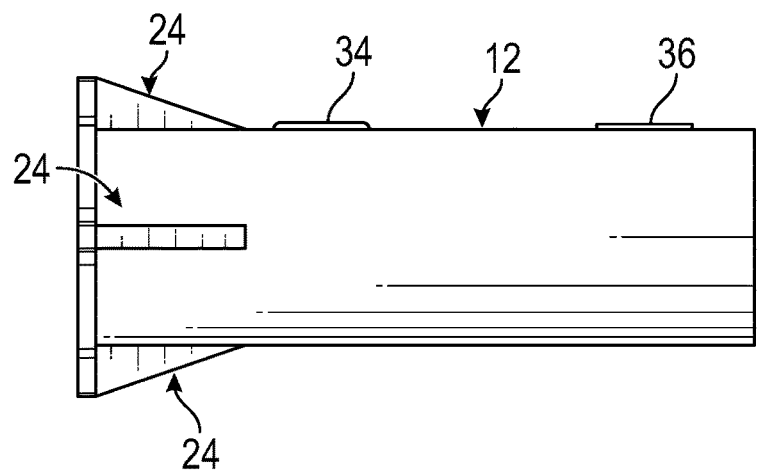
FIG. 3 is a left side view of an embodiment of the disclosure.
Figure 4:
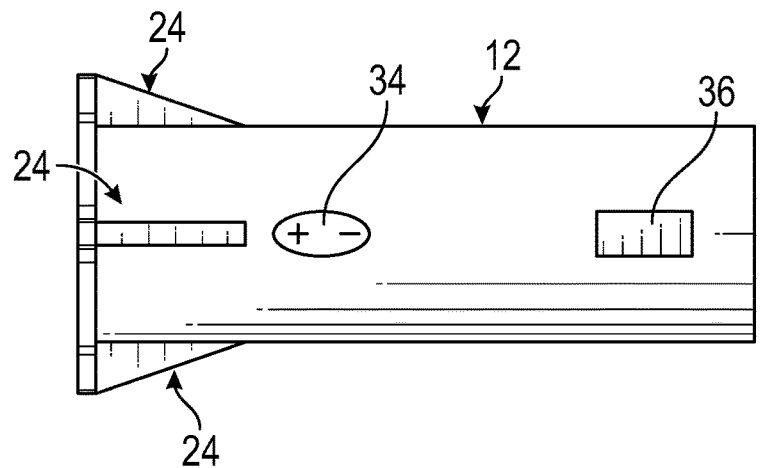
FIG. 4 is a top view of an embodiment of the disclosure.
Figure 5:
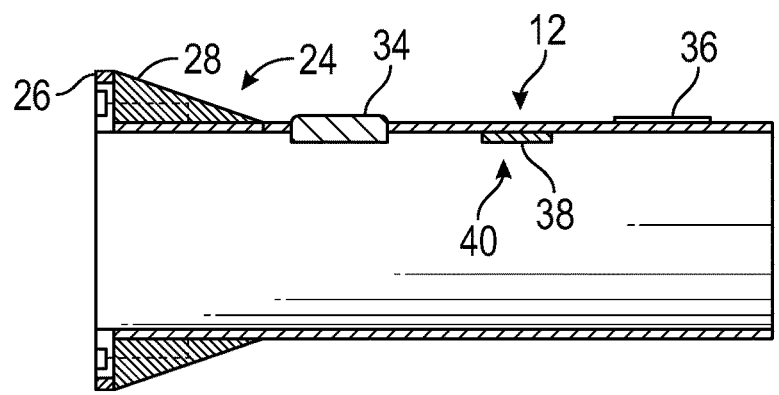
FIG. 5 is a left side cut-away view of an embodiment of the disclosure.
Figure 6:
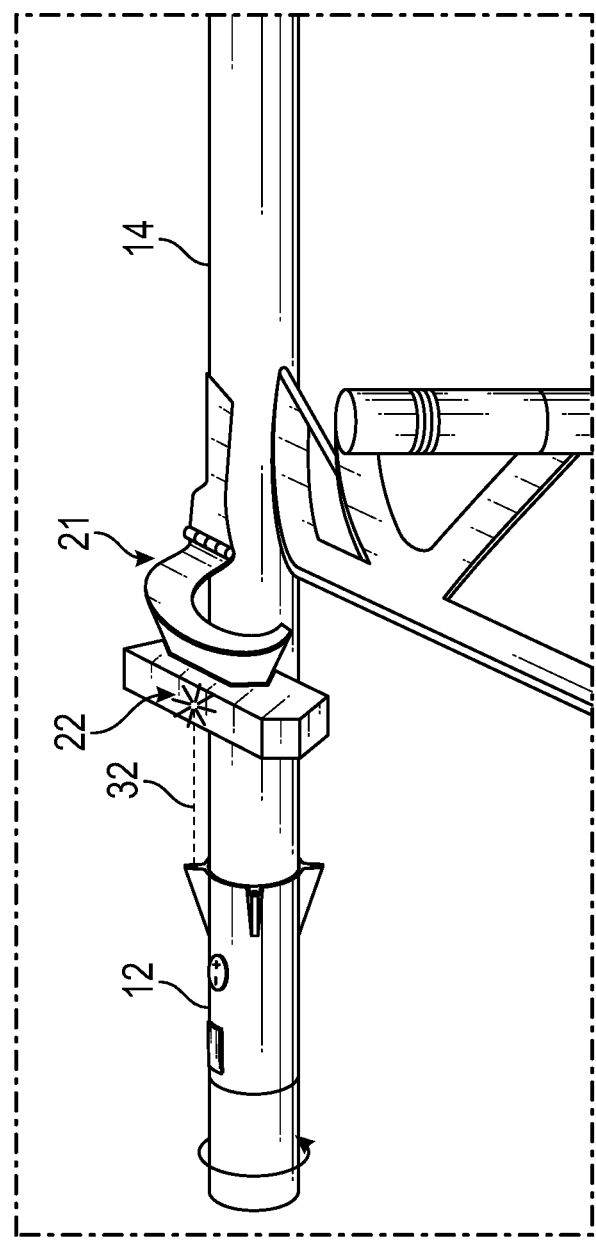
FIG. 6 is a perspective in-use view of an embodiment of the disclosure.

With reference now to the drawings, and in particular to FIGS. 1 through 6 thereof, a new pipe bender device embodying the principles and concepts of an embodiment of the disclosure and generally designated by the reference numeral 10 will be described.

As best illustrated in FIGS. 1 through 6, the pipe bender alignment assembly 10 generally comprises a sleeve 12 that is positionable around a pipe 14. The sleeve 12 has a first end 16, a second end 18 and an outside wall 20 extending between the first end 16 and the second end 18. The pipe 14 may be a metal conduit or other type of pipe that is commonly bent using a pipe bender 21. The pipe bender 21 may be a mechanized pipe bender that has an alignment mark 22. The sleeve 12 may have a length ranging between approximately 5.0 cm and 10.0 cm and a diameter ranging between approximately 2.0 cm and 3.0 cm.

A plurality of laser mounts 24 is each attached to and extends outwardly from the sleeve 12 and each of the laser mounts 24 is positioned on the outside wall 20 of the sleeve 12. Each of the plurality of laser mounts 24 includes a first surface 26 that is perpendicularly oriented with the outside wall 20 of the sleeve 12. The first surface 26 of each of the plurality of laser mounts 24 is aligned with the first end 16 of the sleeve 12. Each of the plurality of laser mounts 24 includes a second surface 28 sloping downwardly between the first surface 26 and the outside wall 20 of the sleeve 12. The plurality of laser mounts 24 is evenly spaced apart from each other and is distributed around a full circumference of the outside wall 20. Additionally, each of the plurality of laser mounts 24 is positioned on a respective quadrant of the first end 16 of the sleeve 12.

A plurality of laser emitters 30 is each mounted to a respective one of the plurality of laser mounts 24 to emit a beam of laser light 32 outwardly from the sleeve 12. The sleeve 12 is rotatable on the pipe 14 thereby facilitating a respective one of the plurality of laser emitters 30 to be aligned with an alignment mark 22 on a pipe bender 21. In this way the beam of laser light 32 emitted from the respective laser light emitter 30 visually indicates that the pipe 14 is precisely located in the pipe bender 21 for accurately bending the pipe 14. Each of the laser emitters 30 is positioned on the first surface 26 of the respective laser mount 24. Furthermore, each of the plurality of laser emitters 30 may comprise a light emitting diode or the like and each of the plurality of laser emitters 30 may emit red light.

A control button 34 is movably integrated into the outside wall 20 of the sleeve 12 and the control button 34 is electrically coupled to the plurality of the laser emitters 30. The control button 34 is positionable in an increasing position for increasing brightness of the plurality of laser emitters 30 toward a maximum brightness. Conversely, the control button 34 is positionable in a decreasing position for decreasing brightness of the plurality of laser emitters 30 toward a minimum brightness. The control button 34 is positioned closer to the first end 16 of the sleeve 12 than the second end 18 of the sleeve 12.

A magnet 36 is integrated into the sleeve 12 and the magnet 36 magnetically engages the pipe 14 for retaining the sleeve 12 at a particular angle of rotation on the pipe 14. In this way the magnet 36 can assist with aligning the beam of laser light 32 with the alignment mark 22 on the pipe bender 21. The magnet 36 is integrated into the outside wall 20 of the sleeve 12 and the magnet 36 is positioned closer to the second end 18 of the sleeve 12 than the control button 34. A power supply 38 is integrated into the outside wall 20 of the sleeve 12, the power supply 38 is electrically coupled to the control button 34 and the power supply 38 comprises at least one battery 40.

In use, the sleeve 12 is slid onto the pipe 14 and the control button 34 is manipulated to actuate the plurality of laser emitters 30 to the desired brightness. The sleeve 12 is rotated until a respective one of the laser mounts 24 is aligned with a mark that has been placed on the pipe 14 to establish a location of a bend. The pipe 14 is positioned in a pipe bender 21 and the pipe 14 is rotated until the beam of laser light 32 emitted by the laser light emitter in the respective laser mount is aligned with the alignment mark 22 on the pipe bender 21. In this way the pipe 14 can be precisely positioned in the pipe bender 21 to perform accurate bends in the pipe 14. Furthermore, a plurality of bends of varying directions and can be precisely formed into the pipe 14 by repositioning the sleeve 12 and aligning the beam of laser light 32 with the alignment mark 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A pipe bender alignment assembly for facilitating a pipe to be precisely oriented in a pipe bender, said assembly comprising:

a sleeve being positionable around a pipe;

a plurality of laser mounts, each of said plurality of laser mounts being attached to and extending outwardly from said sleeve;

a plurality of laser emitters, each of said plurality of laser emitters being mounted to a respective one of said plurality of laser mounts wherein each of said plurality of laser emitters is configured to emit a beam of laser light outwardly from said sleeve, said sleeve being rotatable on said pipe thereby facilitating a respective one of said plurality of laser emitters to be aligned with an alignment mark on a pipe bender wherein said beam of laser light emitted from said respective laser light emitter is configured to visually indicate that the pipe is precisely located in the pipe bender for accurately bending the pipe; and a magnet being integrated into said sleeve, said magnet magnetically engaging the pipe for retaining said sleeve at a particular angle of rotating on the pipe wherein said magnet is configured to assist with aligning the beam of laser light with the alignment mark on the pipe bender.

2. The assembly according to claim 1, wherein:

said sleeve has a first end, a second end and an outside wall extending between said first end and said second end;

each of said laser mounts is positioned on said outside wall of said sleeve, each of said plurality of laser mounts including a first surface being perpendicularly oriented with said outside wall of said sleeve, said first surface of each of said plurality of laser mounts being aligned with said first end of said sleeve, each of said plurality of laser mounts including a second surface sloping downwardly between said first surface and said outside wall of said sleeve; and each of said laser emitters is positioned on said first surface of said respective laser mount.

3. The assembly according to claim 2, wherein said plurality of laser mounts is evenly spaced apart from each other and being distributed around a full circumference of said outside wall, each of said plurality of laser mounts being positioned on a respective quadrant of said first end of said sleeve.

4. The assembly according to claim 2, further comprising a control button being movably integrated into said outside wall of said sleeve, said control button being electrically coupled to said plurality of said laser emitters, said control button being positionable in an increasing position for increasing brightness of said plurality of laser emitters toward a maximum brightness, said control button being positionable in a decreasing position for decreasing brightness of said plurality of laser emitters toward a minimum brightness, said control button being positioned closer to said first end of said sleeve than said second end of said sleeve.

5. The assembly according to claim 4, wherein said magnet is integrated into said outside wall of said sleeve, said magnet being positioned closer to said second end of said sleeve than said control button.

6. The assembly according to claim 4, further comprising a power supply being integrated into said outside wall of said sleeve, said power supply being electrically coupled to said control button, said power supply comprising at least one battery.

7. A pipe bender alignment assembly for facilitating a pipe to be precisely oriented in a pipe bender, said assembly comprising:
  a sleeve being positionable around a pipe, said sleeve having a first end, a second end and an outside wall extending between said first end and said second end;
  a plurality of laser mounts, each of said plurality of laser mounts being attached to and extending outwardly from said sleeve, each of said laser mounts being positioned on said outside wall of said sleeve, each of said plurality of laser mounts including a first surface being perpendicularly oriented with said outside wall of said sleeve, said first surface of each of said plurality of laser mounts being aligned with said first end of said sleeve, each of said plurality of laser mounts including a second surface sloping downwardly between said first surface and said outside wall of said sleeve, said plurality of laser mounts being evenly spaced apart from each other and being distributed around a full circumference of said outside wall, each of said plurality of laser mounts being positioned on a respective quadrant of said first end of said sleeve;
  a plurality of laser emitters, each of said plurality of laser emitters being mounted to a respective one of said plurality of laser mounts wherein each of said plurality of laser emitters is configured to emit a beam of laser light outwardly from said sleeve, said sleeve being rotatable on said pipe thereby facilitating a respective one of said plurality of laser emitters to be aligned with an alignment mark on a pipe bender wherein said beam of laser light emitted from said respective laser light emitter is configured to visually indicate that the pipe is precisely located in the pipe bender for accurately bending the pipe, each of said laser emitters being positioned on said first surface of said respective laser mount;
  a control button being movably integrated into said outside wall of said sleeve, said control button being electrically coupled to said plurality of said laser emitters, said control button being positionable in an increasing position for increasing brightness of said plurality of laser emitters toward a maximum brightness, said control button being positionable in a decreasing position for decreasing brightness of said plurality of laser emitters toward a minimum brightness, said control button being positioned closer to said first end of said sleeve than said second end of said sleeve;
  a magnet being integrated into said sleeve, said magnet magnetically engaging the pipe for retaining said sleeve at a particular angle of rotating on the pipe wherein said magnet is configured to assist with aligning the beam of laser light with the alignment mark on the pipe bender, said magnet being integrated into said outside wall of said sleeve, said magnet being positioned closer to said second end of said sleeve than said control button; and
  a power supply being integrated into said outside wall of said sleeve, said power supply being electrically coupled to said control button, said power supply comprising at least one battery.

* * * * *